United States Patent
Kirtland et al.

(10) Patent No.: US 10,569,805 B2
(45) Date of Patent: Feb. 25, 2020

(54) FRAME ASSEMBLY FOR A VEHICLE AND VEHICLE HAVING SAME

(71) Applicant: Honda Motor Co., Ltd., Tokyo (JP)

(72) Inventors: Dakota D. Kirtland, Dublin, OH (US); Matthew L. Taracko, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 16/002,211

(22) Filed: Jun. 7, 2018

(65) Prior Publication Data
US 2019/0375461 A1 Dec. 12, 2019

(51) Int. Cl.
*B62D 21/03* (2006.01)
*B62D 21/18* (2006.01)
*B62D 23/00* (2006.01)

(52) U.S. Cl.
CPC .......... *B62D 21/03* (2013.01); *B62D 21/183* (2013.01); *B62D 23/005* (2013.01)

(58) Field of Classification Search
CPC ..... B62D 21/03; B62D 21/183; B62D 23/005
USPC ............ 296/203, 29, 30, 205; 280/796, 798
See application file for complete search history.

(56) References Cited

U.S. PATENT DOCUMENTS

| | | | |
|---|---|---|---|
| 5,201,566 A * | 4/1993 | Mori | B62D 21/11 296/192 |
| 5,464,266 A | 11/1995 | Guertler | |
| 6,179,372 B1 * | 1/2001 | Sakamoto | B62D 25/082 280/779 |
| 6,874,843 B2 * | 4/2005 | Awano | B62D 21/152 296/187.09 |
| 7,219,954 B2 * | 5/2007 | Gomi | B62D 21/152 296/187.09 |
| 7,581,781 B2 | 9/2009 | Brunner et al. | |
| 7,614,683 B2 | 11/2009 | Roccato et al. | |
| 8,079,635 B2 | 12/2011 | Devor et al. | |
| 8,632,121 B1 | 1/2014 | Sundararanjan et al. | |
| 8,839,893 B1 * | 9/2014 | Gagnon | B60K 26/04 180/68.3 |
| 9,126,628 B2 | 9/2015 | Tyan et al. | |
| 9,302,715 B2 | 4/2016 | Kim et al. | |
| 2008/0007088 A1 | 1/2008 | Newport | |
| 2013/0056293 A1 * | 3/2013 | Schurna | B62D 23/005 180/68.5 |
| 2013/0069395 A1 * | 3/2013 | Nusier | B62D 25/06 296/203.03 |
| 2016/0339960 A1 * | 11/2016 | Leonard | B60G 3/20 |

FOREIGN PATENT DOCUMENTS

DE     19945590 A1    3/2001
DE     102008039404 A1   2/2010

* cited by examiner

*Primary Examiner* — Dennis H Pedder
(74) *Attorney, Agent, or Firm* — Honda Patents & Technologies North America, LLC; Clifford B Vaterlaus (57) ABSTRACT

A frame assembly for a vehicle can include a cross member, a longitudinal member and a gusset. The cross member can extend along a transverse direction of the vehicle. The cross member can include a bend. The longitudinal member can extend along a longitudinal direction of the vehicle. The gusset can be connected to the longitudinal member and the cross member at the bend.

20 Claims, 9 Drawing Sheets

FIG. 9

FRAME ASSEMBLY FOR A VEHICLE AND VEHICLE HAVING SAME

BACKGROUND

The disclosed subject matter relates to a vehicle and frame assembly for the vehicle. More particularly, the disclosed subject matter relates to methods and apparatus for connecting a plurality of frame members of the frame assembly to each other.

Vehicles, such as but not limited to all-terrain vehicles, can be subjected to relatively large load and/or energy inputs to the frame assembly due to the unevenness of the terrain across which the vehicle is travelling. The all-terrain vehicle can include a generally rigid frame assembly that is designed to withstand the load and energy inputs transmitted from the wheels and through the suspension components during travel over the uneven terrain. For example, off-road durability may make it beneficial to provide very stiff portions of the vehicle frame that form the passenger area, such as but not limited to frame structures around the floor of the vehicle.

SUMMARY

Some embodiments are directed to a frame assembly for a vehicle can include a cross member, a longitudinal member and a gusset. The cross member can extend along a transverse direction of the vehicle. The cross member can include a bend. The longitudinal member can extend along a longitudinal direction of the vehicle. The gusset can be connected to the longitudinal member and the cross member at the bend.

Some embodiments are directed to a frame assembly for a vehicle can include a cross member, a pair of longitudinal members and a pair of gussets. The cross member can extend along a transverse direction of the vehicle. The cross member can include a pair of bends that are spaced apart in the transverse direction of the vehicle. Each of longitudinal members can extend along a longitudinal direction of the vehicle. The longitudinal members can be spaced away from each other in the transverse direction. Each of the gussets can be connected to respective one of the longitudinal members and a respective one of the bends of the cross member.

Some embodiments are directed an all-terrain vehicle that can include a frame assembly and a fluid container. The frame assembly can include a main frame assembly, a front frame assembly and a rear frame assembly. The main frame assembly can define a passenger compartment and include a cross member, a pair of longitudinal members and a pair of gussets. The cross member can extend along a transverse direction of the vehicle. The cross member can include a pair of bends that are spaced apart in the transverse direction of the vehicle. Each of the longitudinal members can extend along a longitudinal direction of the vehicle. The longitudinal members can be spaced away from each other in the transverse direction. Each of the gussets can be connected to respective one of the longitudinal members and a respective one of the bends of the cross member. The front frame assembly can be connected to a front end of the main frame assembly. The front frame assembly can be configured to support a front suspension and wheel assembly. The rear frame assembly can be connected to a rear end of the main frame assembly such that the main frame assembly is located between the front frame assembly and the rear frame assembly. The rear frame assembly can be configured to support a rear suspension and wheel assembly. The fluid container can be connected to the cross member adjacent to the one of the gussets.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Various vehicle design factors may make it challenging to package systems and components on and around the vehicle frame assembly. On relatively small vehicles such as but not limited to an all-terrain vehicle, there may be very limited space available to package the systems and components desired for the vehicle, while also providing a passenger compartment that can be perceived as comfortable and reasonably equipped. Further, aesthetic and/or functionality targets may make it challenging to provide a desired stiffness of the frame assembly around the passenger compartment while also providing space that can be sufficient to package systems and components on and around the vehicle frame assembly. Further still, the targeted weight of the vehicle, and the complexity of the frame assembly with respect to manufacturability may also be design factors. These and other factor(s) can be taken into account in design of the frame assembly, while also considering a suitable dynamic performance for the vehicle.

It may therefore be beneficial to provide a vehicle and a frame assembly for the vehicle with an apparatus that addresses at least one of the above and/or other challenges of related art vehicles. For vehicles that are primarily intended for use on an unimproved path or an unmarked path, it may be beneficial to provide a frame assembly that possesses a relative high stiffness around the passenger area of the vehicle, but does not require a complex construction that results in a relatively high vehicle weight.

Further, it may be beneficial to provide a frame assembly that does not require relatively costly and/or time consuming manufacturing process(es). In particular, in may be beneficial to provide a frame assembly that can be manufactured by one or more processes that are easily and reliably repeatable.

Figure 1:
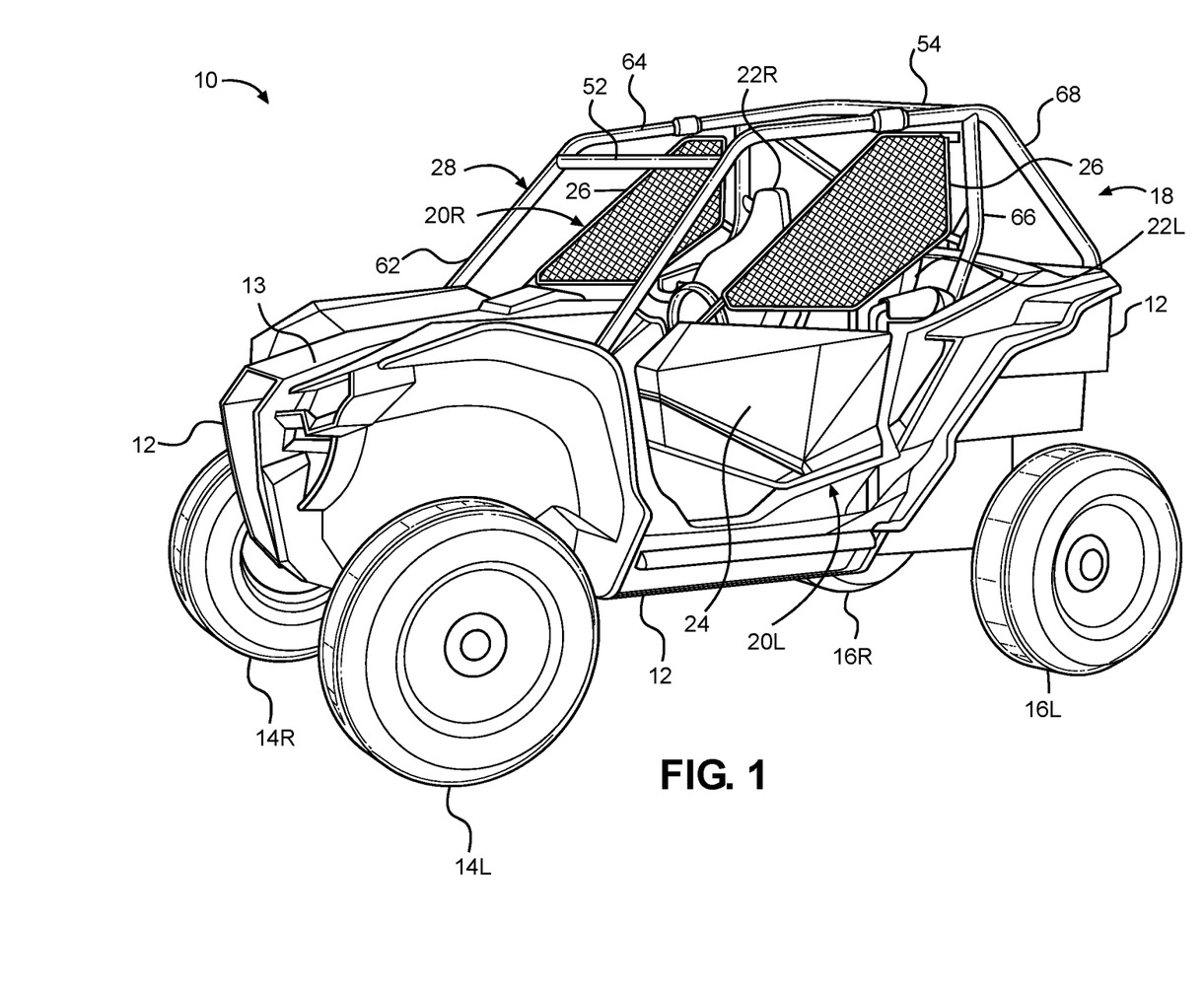
FIG. 1 is a perspective view of a vehicle made in accordance with principles of the disclosed subject matter.

FIG. 1 is a perspective view of an exemplary vehicle 10 including frame assembly 18 in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed vehicle frame assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 2:
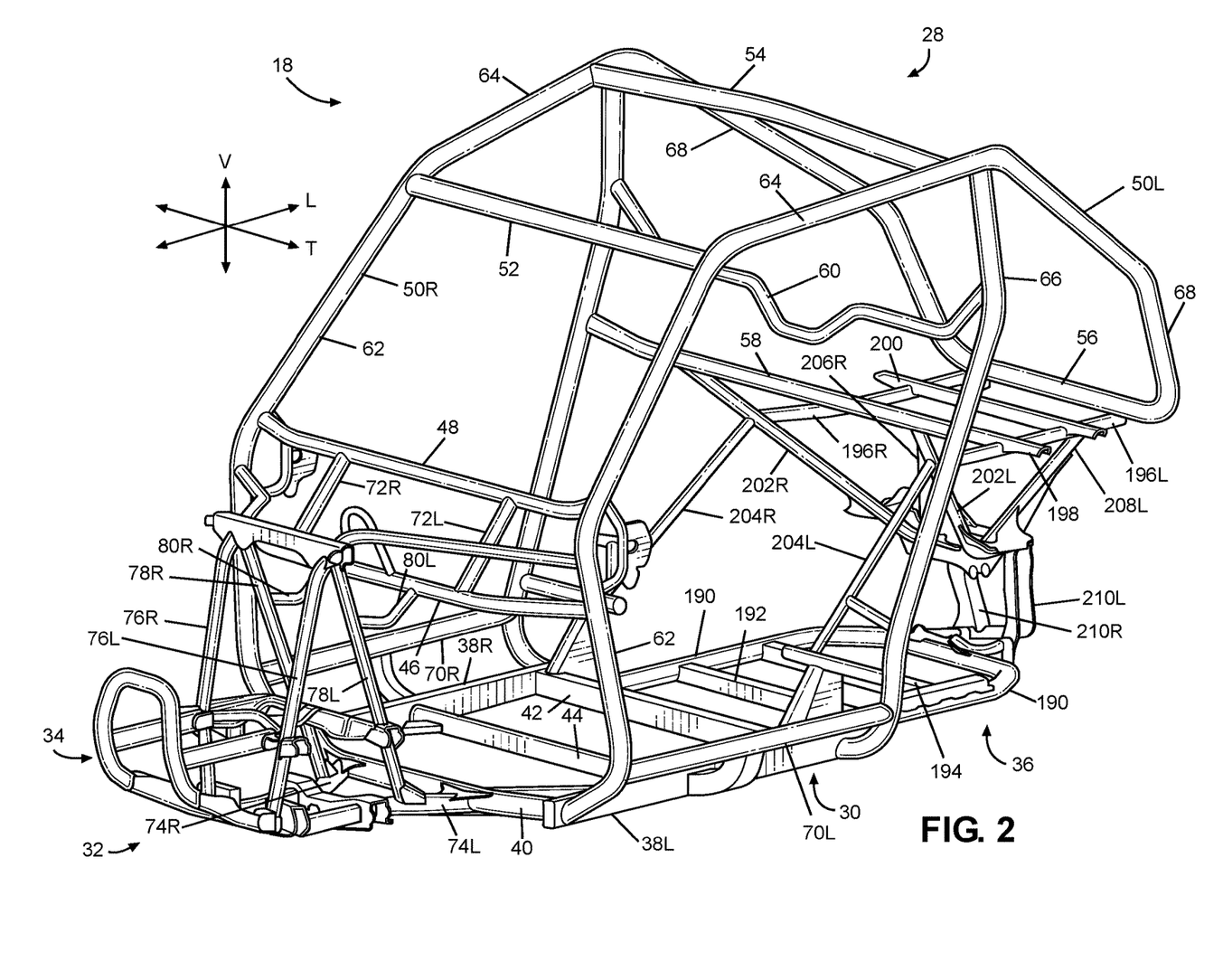
FIG. 2 is perspective front view of a frame assembly of the vehicle of FIG. 1.

The vehicle 10 can include a body 12, a pair of front wheels, 14L, 14R, a pair of rear wheels 16L, 16R, a frame assembly 18, a pair of door assemblies 20L, 20R, and a powertrain. Portions of the frame assembly 18 are hidden from view in FIG. 1 by the body 12 (but are shown in FIG. 2), and the powertrain is omitted from FIGS. 1 and 2 for simplicity and clarity of the drawings.

The vehicle 10 can include a pair of front seats 22L, 22R mounted in a passenger area of the vehicle 10. The frame assembly 18 can include a roll cage 28 configured to extend around and above the seats 22L, 22R and the passenger area. The roll cage 28 can cooperate with the body 12 and/or at least a portion of the frame assembly 18 to define a pair of door openings through which a passenger may pass in order to enter or exit the passenger area.

The door assemblies 20L, 20R, which occupy the door openings, each can include a door 24 and a window panel assembly 26, and can be configured to selectively open and close access through the door openings by moving between a closed position and a fully opened position. (The door 24 of the right-side door assembly 20R is obscured from view in FIG. 1). In the closed position, the door assemblies 20L, 20R, can span the respective door openings to obstruct access to the passenger area via the door openings. In the closed position, the front portion of each door assembly 20L, 20R can be latched to the roll cage 28. The fully opened position can be any position where the door assemblies 20L, 20R are pivoted away from the respective door openings to provide substantially unobstructed access to the passenger area via the door openings. FIG. 1 shows the door assemblies 20L, 20R in the closed position.

The powertrain can include an internal combustion engine, one or more electric motor(s) or a hybrid of an internal combustion engine and one or more electric motor(s), a hydrogen engine, or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14 and selectively drive the rear wheels 16L, 16R. In the exemplary embodiment of FIG. 1, the powertrain is configured as a longitudinally oriented, rear-mounted internal combustion engine that drives the rear wheels 16L, 16R and selectively drives the front wheels 14L, 14R.

II. Frame Assembly

Figure 3:
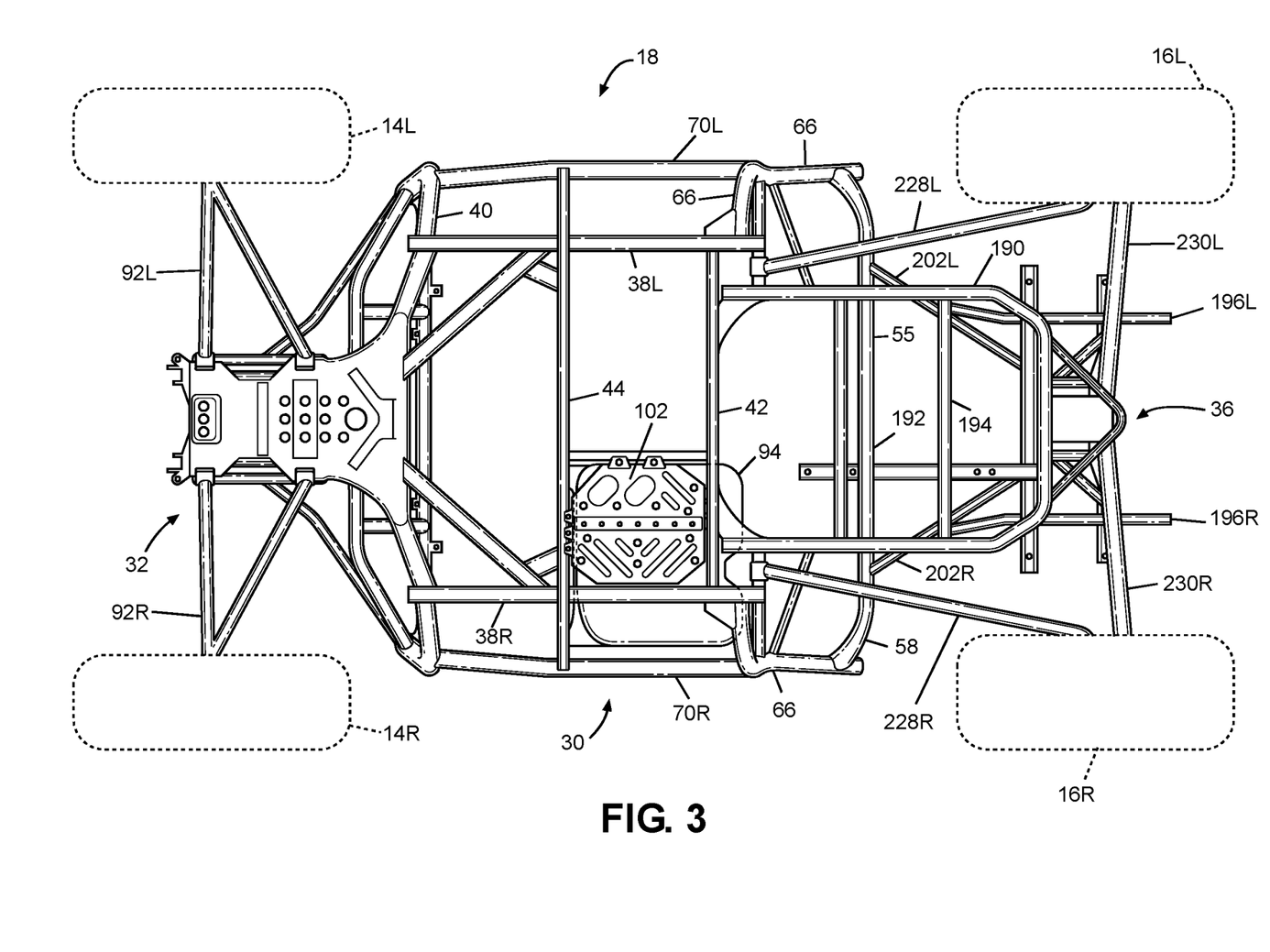
FIG. 3 is bottom view of a portion of the frame assembly of FIG. 2 and a supported structure attached to the frame assembly.

FIG. 2 is a perspective view of the frame assembly 18 of the vehicle 10 shown in FIG. 1, with the body 12 and all other components, assembly(ies) and system(s) removed. FIG. 3 is a bottom plan view of the frame assembly 18 of FIG. 2, and certain structures supported on the frame assembly 18.

The frame assembly 18 can be configured to support the body 12, door assemblies 20L, 20R, seats 22L, 22R, suspension components 92L, 92R, 228L, 228R, 230L, 230R for the wheels 14L, 14R, 16L, 16R, powertrain, steering system, control pedal assemblies, passengers and cargo items. The frame assembly 18 can be configured to withstand various modes of operation, including operation on unimproved paths, and can be configured to surround the passenger area.

The frame assembly 18 can include a main frame assembly 30, a front frame assembly 32, a front bumper assembly 34 and a rear frame assembly 36. The bumper assembly 34 of the frame assembly 18 is omitted from FIG. 3 for simplicity and clarity of he drawing.

The main frame assembly 30 can define the passenger area of the vehicle 10. The main frame assembly 30 can also provide an overall bending stiffness and torsional stiffness characteristic for the vehicle 10 that can be advantageous for rugged terrain of an unimproved path. In addition to the seats 22L, 22R and the driving controls, the main frame assembly can support one or more structures 94.

The front frame assembly 32 can be connected to the front end of the main frame assembly 30. The front frame assembly 32 can be configured with mounting points for the front suspension components 92L, 92R and any appropriate components/systems, such as but not limited to portions of the body 12, a front final drive assembly, steering system components, engine cooling system, headlights, etc.

The front bumper assembly 34 can be connected to the front end of the front frame assembly 32, such that the front frame assembly 32 can be located between the front bumper assembly 34 and the main frame assembly 30. The front bumper assembly 34 can extend beyond the exterior of the body 12, or alternatively, one or more portions of the body 12 can conceal the front bumper assembly 34.

The rear frame assembly 36 can be connected to the rear end of the main frame assembly 30 such that the passenger compartment is located between the front frame assembly 32 and the rear frame assembly 36. The rear frame assembly 36 can be configured with mounting points for the rear suspension components 228L, 228R, 230L, 230R and any appropriate components/systems, such as but not limited to portions of the body 12, a rear final drive assembly, taillights, etc.

The main frame assembly 30, front frame assembly 32, front bumper assembly 34 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

A. Front Frame Assembly

Referring to FIG. 2, the front frame assembly 32 can be connected to a first lower cross member 40 and each of the first cage side members 62 of the main frame assembly 30. The front frame assembly 32 can include the front bumper assembly 34, a pair of front lower members 74L, 74R, a pair of first front members 76L, 76R, a pair of second front members 78L, 78R, a pair of intermediate members 80L, 80R and a transverse frame assembly 82.

The front frame members 76L, 76R, 78L, 78R can be spaced apart from each other in the transverse direction T of the vehicle 10 by a predetermined distance sufficient to accommodate any component(s) and/or system(s) to be supported by the front frame assembly 32. The front frame assembly 32 can be configured to support a front suspension and wheel assembly, and other components such as but not limited to a radiator, a steering rack assembly and a front final drive assembly. The front suspension and wheel assembly can include, at least one suspension member 92L, 92R on each side of the front frame assembly 32, a damper and spring assembly on each side of the front frame assembly 32, a front hub assembly on each side of the front frame assembly 32, and the front wheels 14L, 14R.

In the exemplary embodiment of FIG. 2, each of the front lower frame members 74L, 74R, the first front frame members 76L, 76R, the second front frame members 78L, 78R are configured as hollow metal tubes having a substantially circular cross-section. However, any combination of the front lower frame members 74L, 74R, the first front frame members 76L, 76R and the second front frame members 78L, 78R can be have a cross-sectional shape that is different from a substantially circular cross-sectional shape. Further, any combination of the front lower frame members 74L, 74R, the first front frame members 76L, 76R and the second front frame members 78L, 78R can be formed of a material other than metal, such as but not limited to carbon fiber, plastic, carbon fiber reinforced plastic, ceramic, pulp, or glass fiber reinforced plastic.

Further, the front lower frame members 74L, 74R, the first front frame members 76L, 76R, the second front frame members 78L, 78R can be welded to each other to form the structure described above. However, embodiments are intended to include or otherwise cover any combination of the front lower frame members 74L, 74R, the first front frame members 76L, 76R and the second front frame members 78L, 78R connected by threaded fasteners, adhesives, a combination of brackets and threaded fasteners, rivets, or other known connective structures, materials, or methods.

B. Front Bumper Assembly

The front frame assembly 32 can include the front bumper assembly 34. Referring to FIG. 2, the front bumper assembly 34 can be connected to the front side of the first frame members 76L, 76R, such that the first and second frame members 76L, 76R, 78L, 78R are located between or intermediate the front bumper assembly 34 and the main frame assembly 30.

The front bumper assembly 34 can be configured to deform in a predetermined and controlled manner in response to load or kinetic energy input to the front bumper assembly 34 that exceeds a predetermined threshold.

C. Rear Frame Assembly

Referring to FIGS. 2 and 3, the rear frame assembly 36 can include a plurality of rear frame members 190, 192, 194, 196L, 196R, 198, 200, 202L, 202R, 204L, 204R, 206L, 206R, 208L, 208R, 210L, 201R. The rear frame members 190, 192, 194, 196L, 196R, 198, 200, 202L, 202R, 204L, 204R, 206L, 206R, 208L, 208R, 210L, 210R can be configured to define a lower cradle assembly, an upper bed support assembly, and a suspension support assembly. The lower cradle assembly can be configured to mount and supporting the power source and a portion of the rear suspension and wheel assembly in any appropriate manner. The upper bed support can be configured to support a storage area of the vehicle 10. Referring to FIG. 3, the suspension support assembly can be configured to support the at least one rear suspension member 228L, 228R of the rear suspension and wheel assembly on each side of the rear frame assembly 36.

D. Main Frame Assembly

Referring to FIGS. 2 and 3, the main frame assembly 30 can define the passenger area and can include the roll cage 28, a pair of longitudinal members 38L, 38R and a plurality of lower cross members 40, 42, 44, a pair of upper cross members 46, 48 and a pair of support members 72L, 72R.

The longitudinal members 38L, 38R can extend along the longitudinal direction L of the vehicle 10, from the front of the passenger area to the rear of the passenger area. The longitudinal members 38L, 38R can each be configured as a substantially straight, hollow beam having a substantially rectangular cross-sectional shape.

The first through third lower cross members 40, 42, 44 can extend in the transverse direction T of the vehicle 10, from the left longitudinal member 38L to the right longitudinal member 38R. The first lower cross member 40 can be slightly bent along the longitudinal direction L near each end toward the rear of the vehicle 10. The first lower cross member 40 can be a hollow tube having a substantially circular cross-sectional shape. The second lower cross members 42 can be configured as a substantially straight, hollow beam having a substantially rectangular cross-sectional shape. The third lower cross member 44 can be configured as hollow beam having a substantially rectangular cross-sectional shape.

The first lower cross member 40 can be connected to each of the longitudinal members 38L, 38R adjacent a respective front end of the longitudinal members 38L, 38R. The second lower cross member 42 can be connected to each of the longitudinal members 38L, 38R adjacent a respective rear end of the longitudinal members 38L, 38R. The third lower cross member 44 can be connected to each of the longitudinal members 38L, 38R at a portion of the longitudinal members 38L, 38R intermediate the front and rear ends of the respective longitudinal members 38L, 38R. In the exemplary embodiment of FIGS. 2 and 3, welds can connect the lower cross members 40, 42, 44 to the longitudinal members 38L, 38R.

The first and second upper cross members 46, 48 can extend in the transverse direction T of the vehicle 10 from the left cage side assembly 50L to the right cage side assembly 50R. The first upper cross member 46 can be spaced away from the second upper cross member 48. The second upper cross member 48 can be connected to the cage side assemblies 50L, 50R at a position that is higher in the vertical direction V of the vehicle 10 than the position at which the first upper cross member 46 is connected to the side assemblies 50L, 50R.

The support members 72L, 72R can extend generally in the vertical direction V of the vehicle 10 from the first upper cross member 46 to the second upper cross member 48. The support member 72L, 72R can be spaced apart from each other in the transverse direction T of the vehicle 10. The support members 72L, 72R can each be configured as a hollow tube having a substantially circular cross-sectional shape. In the exemplary embodiment of FIG. 2, welds can connect the support members 72L, 72R to the upper cross members 46, 48.

The upper cross members 46, 48 and the support members 72L, 72R can be configured to support and secure a panel assembly (such as but not limited to an instrument panel assembly), a steering assembly, and/or a portion of the body 12 (such as but not limited to a hood panel 13—see FIG. 1).

The roll cage 28 can include a pair of cage side assemblies 50L, 50R, a plurality of cage cross members 52, 54, 56, 58, 60. The roll cage 28 generally defines the passenger compartment.

The cage side assemblies 50L, 50R can extend in the longitudinal direction L of the vehicle 10, from the front end of the passenger area to the rear end of the passenger area. The cage side assemblies 50L, 50R can define the limits of the passenger area in the transverse direction T of the vehicle 10, the longitudinal direction L of the vehicle 10 and in the vertical direction V of the vehicle 10. The cage side assemblies 50L, 50R can be configured to support the door assemblies 20L, 20R and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The cage side assemblies 50L, 50R can be configured to resist, impede, or minimize deformation that could be caused by a load or kinetic energy input into either or both of the cage side assemblies.

Each of the cage side assemblies 50L, 50R can be formed from any appropriate number of structural elements, from one to any number greater than one. The side cage assemblies 50L, 50R can be configured with any shape and contour that can be advantageous to meet the structural performance and aesthetic appeal desired for the vehicle 10. The following description will be directed toward the left cage side assembly 50L with the understanding that the right cage side assembly 50R can be a mirror image of the left cage side assembly 50L.

The left cage side assembly 50L can include a plurality of cage side members 62, 64, 66, 68, 70L. Each of the first through fifth cage side members 62, 64, 66, 68, 70L can be configured as a hollow tube having a substantially circular cross-section shape. The cage side members 62, 64, 66, 68, 70L can be configured with any appropriate elongated shape that can provide the desired dimensionality of the passenger area and advantageously conform to the aesthetic appearance desired for the vehicle 10.

The first cage side member 62 can be referred to as an A-pillar. The first cage side member 62 can be connected at one end to the left longitudinal member 38L adjacent the front end of the left longitudinal member 38L. The first cage side member 62 can be connected to a side of the left longitudinal member 38L that can be opposite to the side to which the first cross member 40 is connected. The one end of the first cage side member 62 can be aligned in the transverse direction T with the end of the first cross member 40 that is connected to the left longitudinal member 38L.

Each of the upper cross members 46, 48 can be connected to a middle portion of the first cage side member 62 of each of the cage side assemblies 50L, 50R.

The third cage side member 66 can be referred to as a B-pillar. The third cage side member 66 can be connected at one end to the left longitudinal member 38L adjacent the rear end of the left longitudinal member 38L. The third cage side member 66 can be connected to a side of the left longitudinal member 38L that can be opposite to the side to which the second lower cross member 42 is connected. The one end of the third cage side member 66 can be aligned in the transverse direction T with the end of the second cross member 42 that is connected to the left longitudinal member 38L.

The fifth cage side member 70L can extend along the longitudinal direction L of the vehicle 10. The fifth cage side member 70L can be spaced away from the left-side longitudinal member 38L in each of the transverse direction T and the vertical direction V of the vehicle 10. The first cage side member 70L can extend from each of the first and third cage members 62, 66.

The first through fifth cage cross members 52, 54, 56, 58, 60 can extend in the transverse direction T of the vehicle 10 from the left side assembly 50L to the right side assembly 50R. The cage cross members 52, 54, 56, 58, 60 can be connected to each of the side assemblies 50L, 50R at respective locations spaced apart along the longitudinal direction L of the vehicle 10. The cage cross members 52, 54, 56, 58, 60 can be configured to maintain a predetermined spacing between the left cage side assembly 50L and the right cage side assembly 50R in the transverse direction T. The cage cross members 52, 54, 56, 58, 60 can define the limits of the passenger area in the longitudinal direction L of the vehicle 10 and the vertical direction V of the vehicle 10. The cage cross members 52, 54, 56, 58, 60 can be configured to manage load and/or energy inputs so that deflection of the frame assembly 18 in the vicinity of the passenger area can be controlled in an advantageous predetermined manner. In the exemplary embodiment of FIG. 2, the cage cross members 52, 54, 56, 58, 60 can be connected to the cage side assemblies 50L, 50R by welding.

1. Cross Member

Figure 4:
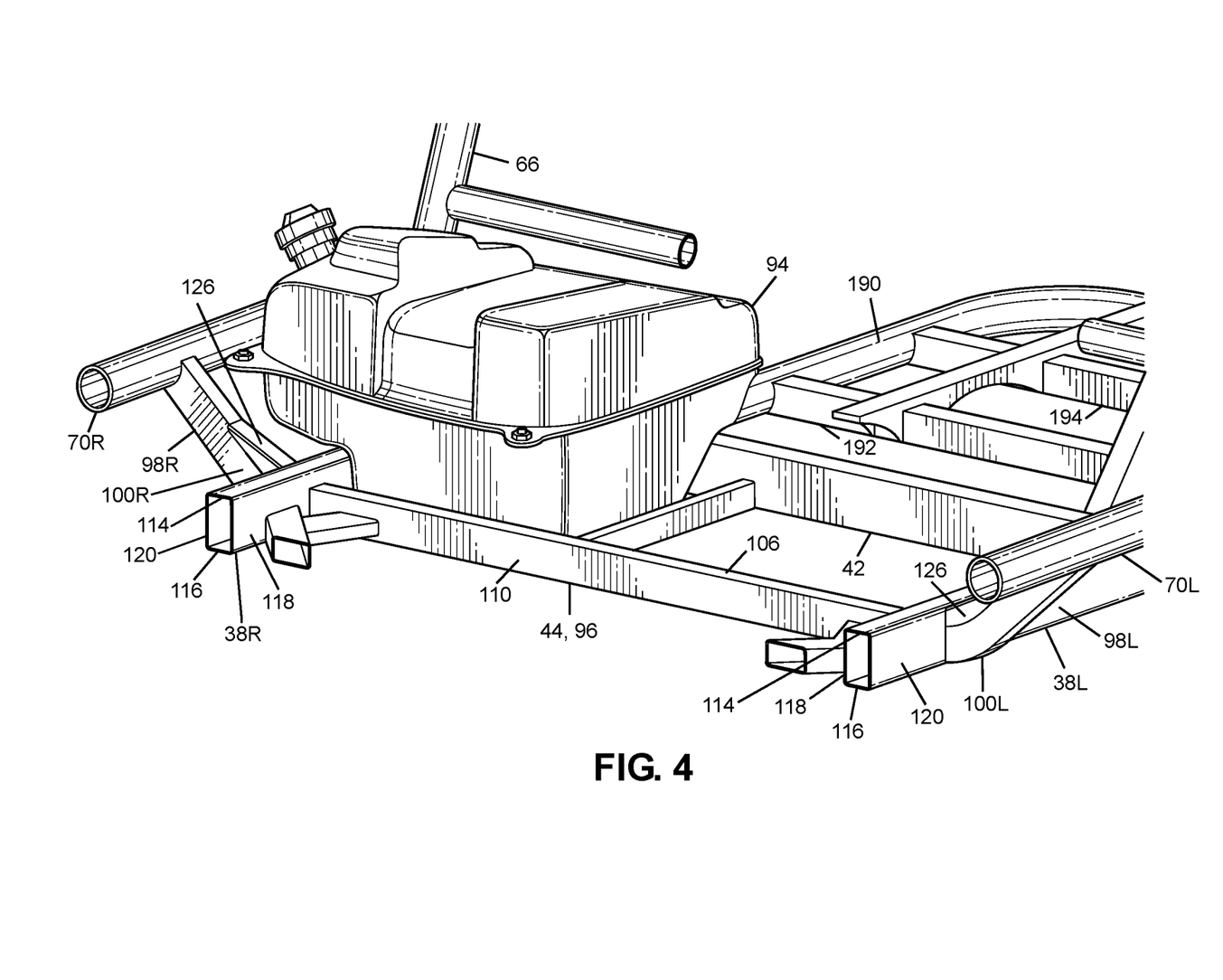
FIG. 4 is a partial perspective view of the frame assembly of FIG. 2 and the supported structure attached to the frame assembly.
Figure 5:
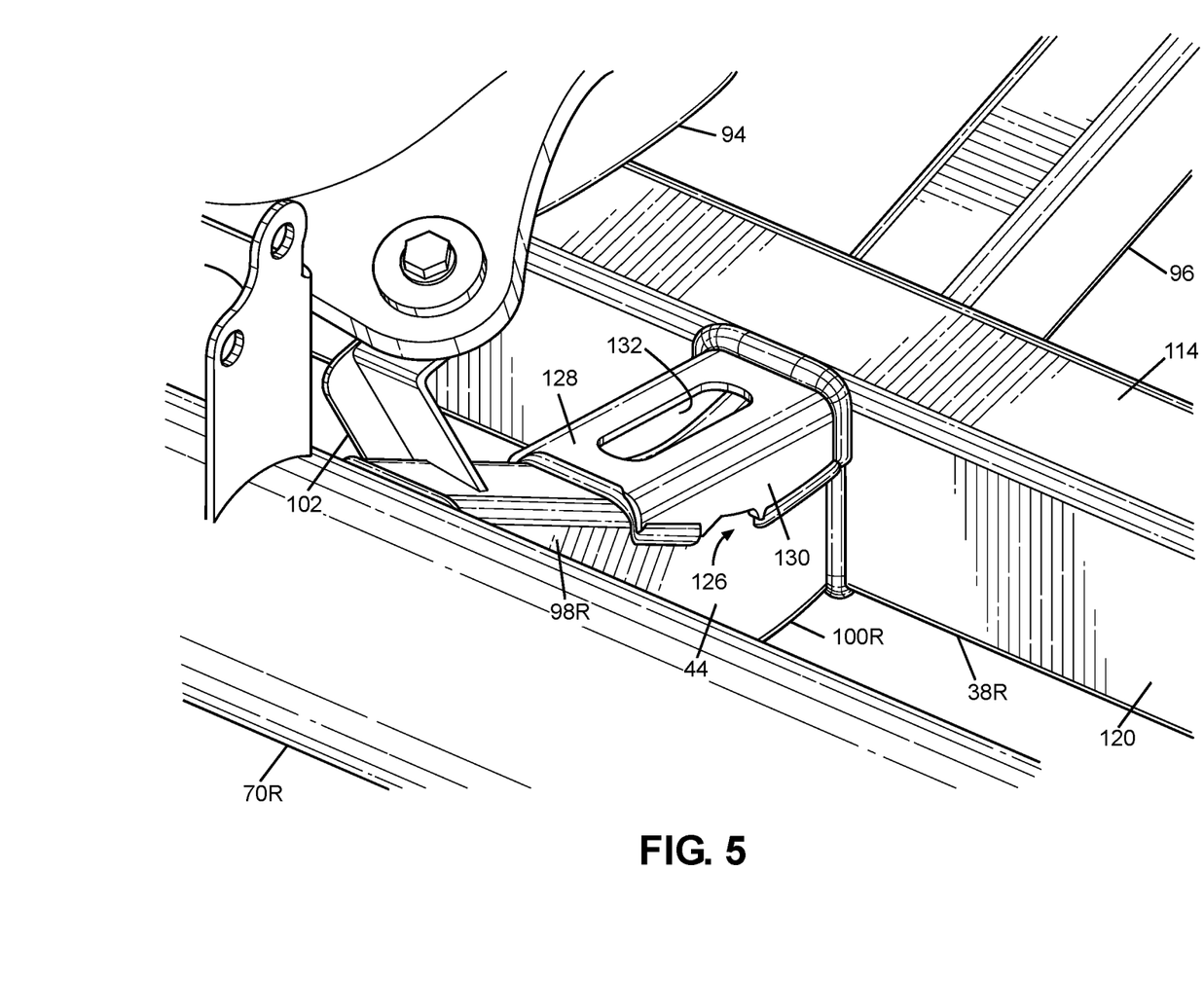
FIG. 5 is a partial perspective view of a portion of the right side of the frame assembly of FIG. 2 with the supported structure attached to the frame assembly.

Referring to FIGS. 3-5, the third lower cross member 44 can cooperate with the right-side longitudinal member 38R and the second lower cross member 42 to support the structure 94 on the main frame assembly 30. Referring to FIG. 3, the third lower cross member 44 can cooperate with the right-side longitudinal member 38R and the second lower cross member 42 to provide a connection area for a skid plate 102. Further, the third lower cross member 44 can cooperate with the right-side longitudinal member 38R, the second lower cross member 42, the right-side fifth cage member 70R and the skid plate 102 to provide a predetermined level of protection for the structure 94 against impact by an external object from below the vehicle 10 or from the right side of the vehicle.

In the exemplary embodiment, the structure 94 is depicted as a fuel tank. However, the structure 94 can be any appropriate component, system, or assembly of the vehicle 10 that is separate from the frame assembly 10, such as but not limited to a container for a fluid other than fuel, a battery case and battery, a seat, a storage area, etc. Referring to FIG. 5, the structure 94 can include a mounting flange 104 that can be connected to a right-side second portion 98R of the third lower cross member 44. The flange 104 can be connected to the third lower cross member 44 in any appropriate manner such as but not limited to welding, adhesive, mechanical fasteners, etc.

Referring to FIGS. 2-5, the third lower cross member 44 can extend from and can be connected to each of the longitudinal members 38L, 38R and each of the fifth cage side members 70L, 70R. In the exemplary embodiment of FIGS. 1-8 the third lower cross member 44 can be welded to each of the longitudinal members 38L, 38R and each of the fifth cage side members 70L, 70R. Thus, the third lower cross member 44, each of the longitudinal members 38L, 38R and each of the fifth cage side members 70L, 70R can provide a predetermined rigid portion of the main frame assembly 30.

Figure 6:
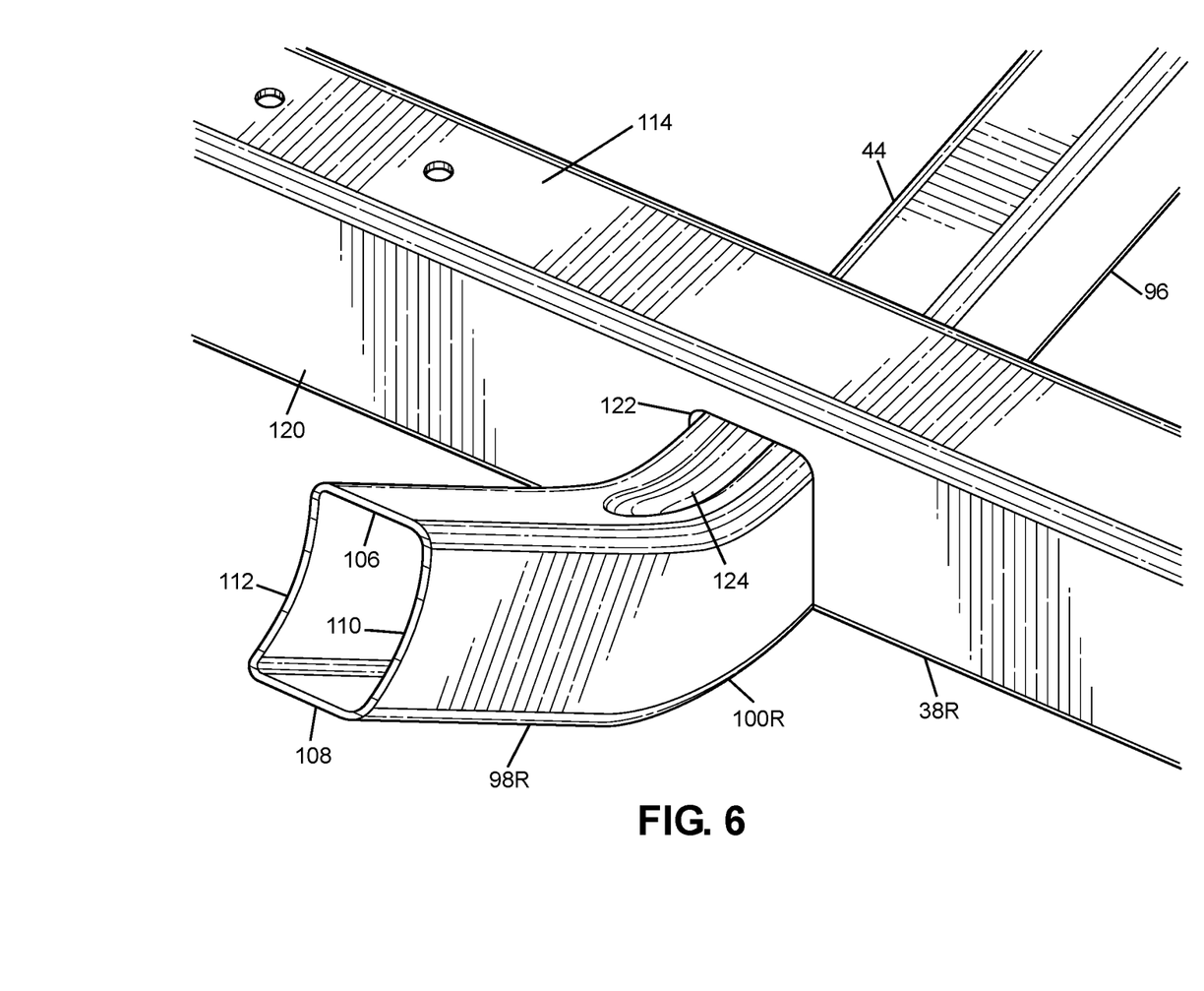
FIG. 6 is a partial perspective view of a portion of the right side of the frame assembly of FIG. 2 before a gusset in accordance with the disclosed subject is attached to the frame assembly of FIG. 2.
Figure 7:
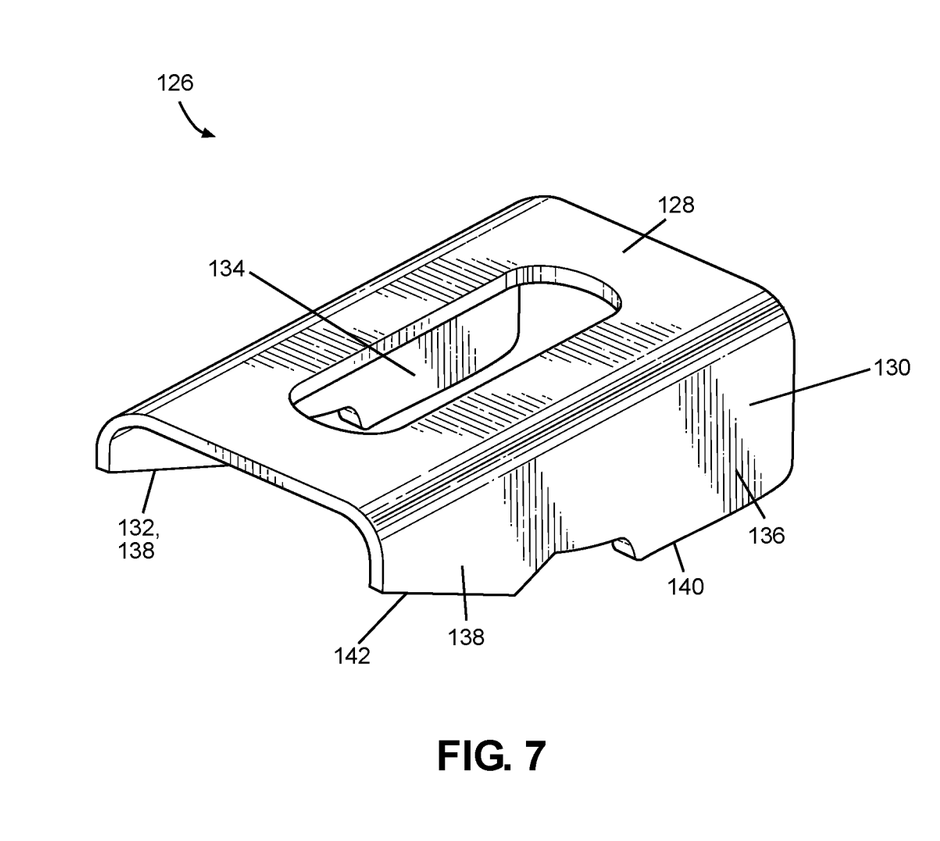
FIG. 7 is a perspective view of a gusset in accordance with the disclosed subject matter.
Figure 8:
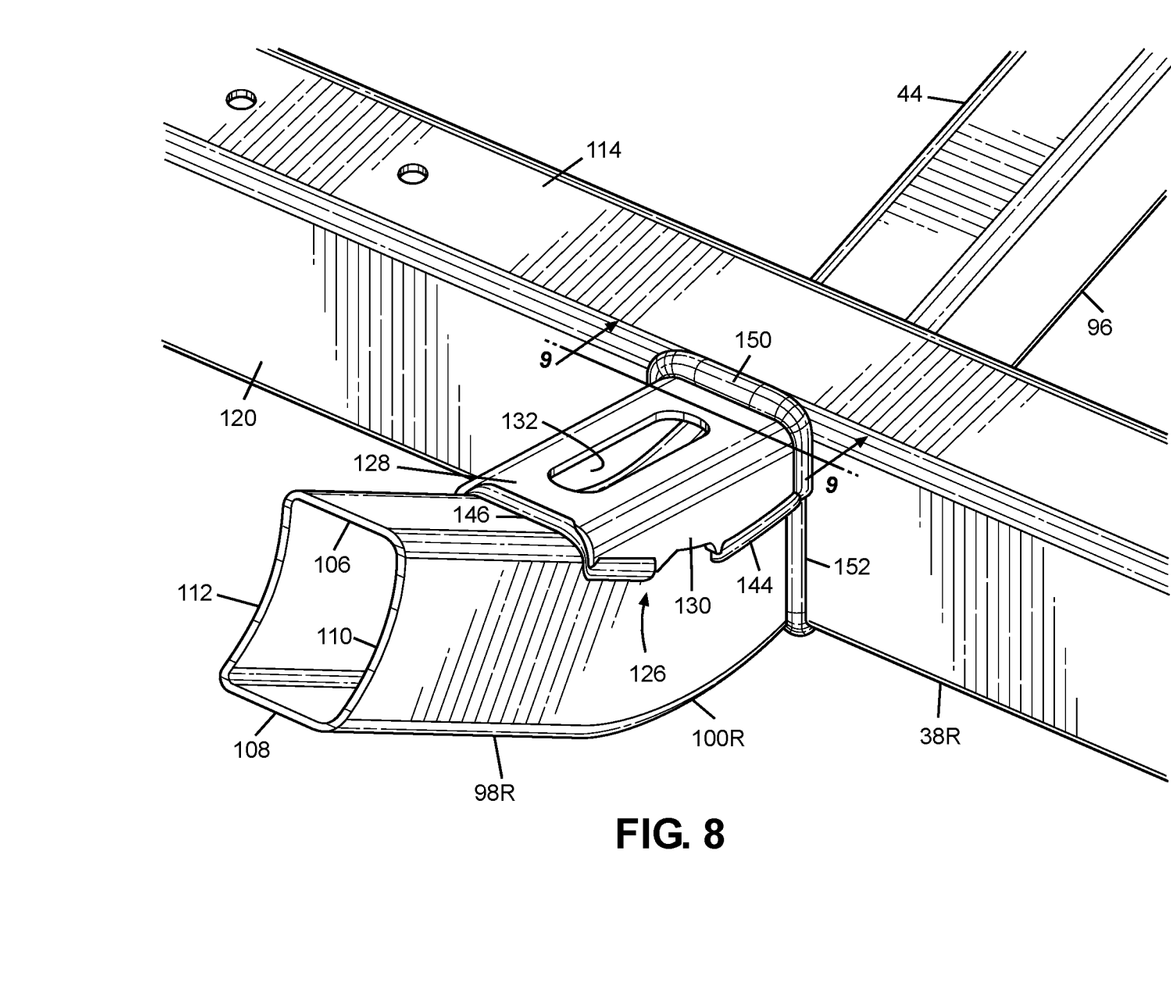
FIG. 8 is a partial perspective view of a portion the right side of the frame assembly of FIG. 2.
Figure 9:
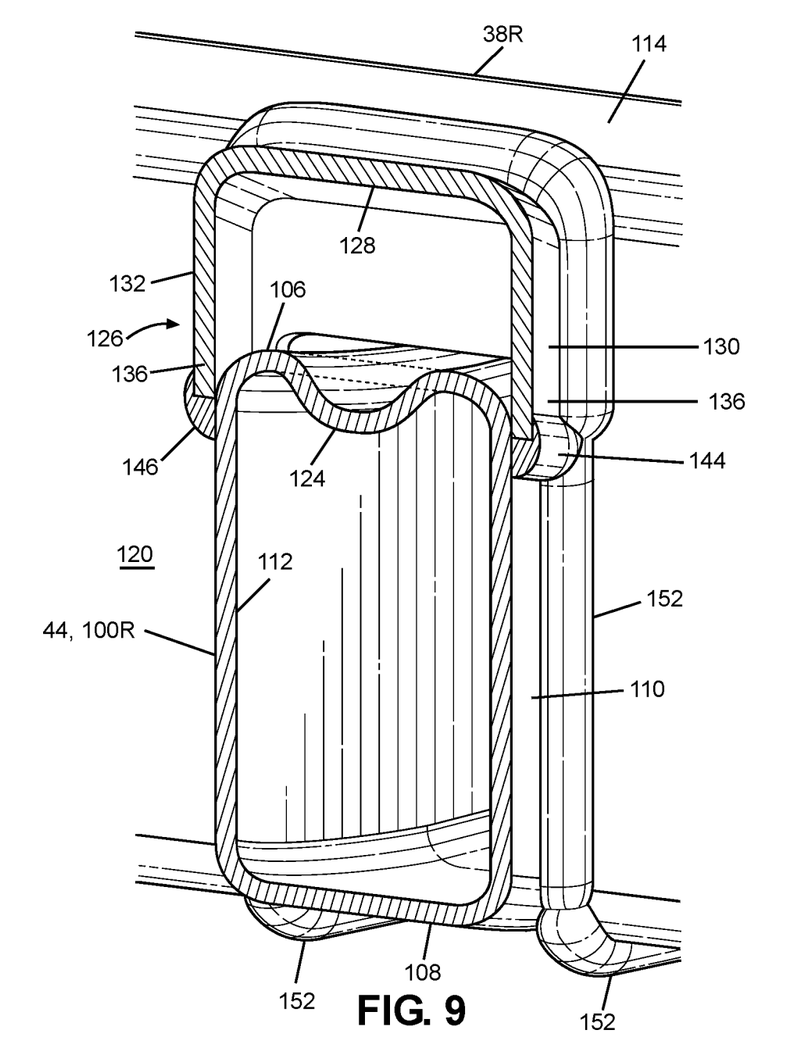
FIG. 9 is a cross-sectional view taken along line 9-9 of FIG. 8.

Referring to FIGS. 2-9, the third lower cross member 44 can have a substantially rectangular cross-sectional shape. Referring to FIGS. 6, 8 and 9, the third lower cross member 44 can include a top wall 106, a bottom wall 108 and a pair of side walls 110, 112. The top and bottom walls 106, 108 can extend along the transverse direction T and the longitudinal direction L of the vehicle 10. The side walls 110, 112 can extend along the transverse direction T and the vertical direction V of the vehicle 10. The side walls 110, 112 can be connected to and can extend away from each of the top wall 106 and the bottom wall 108.

Referring to FIG. 4, each of the longitudinal members 38L, 38R can have a substantially rectangular cross-sectional shape. Each of the longitudinal members 38L, 38R can include a top wall 114, a bottom wall 116 and a pair of side walls 118, 120. The top and bottom walls 114, 116 can extend along the transverse direction T and the longitudinal direction L of the vehicle 10. The side walls 118, 120 can extend along the longitudinal direction L and the vertical direction V of the vehicle 10. The side walls 118, 120 can be connected to and can extend away from each of the top wall 114 and the bottom wall 116.

Referring to FIG. 6, the height of the side walls 118, 120 of each of the longitudinal members 38L, 38R measured along the vertical direction V of the vehicle 10 can be greater than the height of the side walls 110, 112 of the third lower cross member 44 measured along the vertical direction V of the vehicle 10. Each of the longitudinal members 38L, 38R can include a cutout portion 122 that can accommodate the third lower cross member 44. The cutout portion 122 can interrupt the bottom wall 116 in the longitudinal direction L of the vehicle 10. The cutout portion 122 can extend along each of the side walls 110, 112 and can terminate along each of the side walls 110, 112 at a location that is spaced away from the top wall 106.

The cutout portion 122 can closely follow the outer contour of the third lower cross member 44 within a predetermined tolerance that is intended to limit the size of the gap between the edges of the cutout portion 122 and the top wall 106 and the side walls 110, 112 of the third lower cross member 44. A gap between the cutout 122 and the top wall 106 or either of the side walls 110, 112 that exceeds the predetermined tolerance can prevent a weld to be placed where the gap exceeds the predetermined tolerance. Thus, the predetermined tolerance can ensure a that a weld can be placed between the third lower cross member 44 and each of the longitudinal members 38L, 38R.

Referring to FIG. 4, the third lower cross member 44 can include a first portion 96, a pair of second portions 98L, 98R and a pair of bends 100L, 100R.

The first portion 96 can extend from each of the longitudinal members 38L, 38R. The first portion 96 can be substantially straight. The first portion 96 can extend along the transverse direction T of the vehicle 10. Each of the second portions 98L, 98R can extend from a respective one of the left-side fifth cage side member 70L and the right-side fifth cage side member 70R. That is, the first portion 96 can be on one side of each the longitudinal members 38L, 38R, and each of the second portions 98L, 98R can be on another side of the respective one of the longitudinal members 38L, 38R that is spaced apart from the one side along the transverse direction T of the vehicle 10.

Each of the second portions 98L, 98R can be substantially straight. Each of the second portions 98L, 98R can extend along each of the transverse direction T and the vertical direction V of the vehicle 10. The bends 100L, 100R can extend from the first portion 96 to a respective one of the second portions 98L, 98R. The bends 100L, 100R can have a curvature that transitions from the first portion to a respective one of the second portions 98L, 98R. At least a portion of each of the bends 100L, 100R extends from the respective one of the longitudinal members 38L, 38R to the respective one of the fifth cage side members 70L, 70R. The bends 100L, 100R can be made by bending a straight hollow tube in a tube bending apparatus.

Referring to FIGS. 6 and 9, the third lower cross member 44 can include a deformed portion 124 on at least the top wall 106 of the third lower cross member 44 at each of the bends 100L, 100R. The deformed portion 124 can result from the bending process that produces the bends 100L, 100R. The deformed portions 104 can cause the gap between the deformed portion and cutout portion 122 each of the longitudinal members 38L, 38R to exceed the predetermined tolerance. As discussed above a gap between the cutout 122 and the deformed portion 12 exceeds the predetermined gap, then the weld might not be placed at this location, manually or by an automated welding process. Thus, the third lower cross member 44 can be rendered useless; thereby wasting material and time.

Further, the deformed portion 104 can adversely impact an automated welding process that is intended to weld the third lower cross member 44 to each of the longitudinal members 38L, 38R. Typically, and automated welding process relies on a predetermined weld pattern. Generally, each deformed portion 104 can have a similar shape. However, it is possible that the deformed portion 104 at one the bends 100L, 100R is slightly different in shape than the predetermined shape. Further, it is possible that the deformed portion 104 at one the bends 100L, 100R is slightly different in shape than the deformed portion 104 at the other of the bends 100L, 100R. Further still, the deformed portions 104 of one third lower cross member 44 can vary slightly in shape as compared to the deformed portions 104 of another third lower cross member 44. This difference in shape, no matter how significant or how slight, can be difficult to accommodate by predetermined welding pattern used for the automated welding process.

Although the deformed portion 124 is shown as having relatively smooth contours and an appearance of some degree of symmetry, the deformed portion 124 can have any configuration such as but not limited to an asymmetric shape, a shape that include one or more sharp folds, a shape that includes one or more ripples that extend along the longitudinal direction L of the vehicle 10 and spaced at intervals along the transverse direction T of the vehicle 10, and any combination thereof.

2. Gusset

Referring to FIGS. 4, 5 and 7-9, a gusset 126 can be connected to each of the third lower cross member 44 and a respective one of the longitudinal members 38L, 38R. The gusset 126 can be configured to compensate for the deformed portion 124 so that variations in the gap between the cutout 122 and the outer surfaces of the third lower cross member 44 caused by the deformed portion 124 do not affect the ability to weld the third lower cross member 44 to each of the longitudinal members 38L, 38R, whether the welding process is performed manually or by an automated process. Further, the gusset can be configured to increase the rigidity of the joint between the third lower cross member 44 to each of the longitudinal members 38L, 38R.

The following description is directed to the gusset on the right-side of the main frame assembly 30 with the understanding that the gusset 126 on the left side of the main frame assembly 30 can be identical to the gusset 126 on the right side of the main frame assembly 30. Alternatively, the gusset 126 on the left side of the main frame assembly 30 can be a mirror image of the gusset 126 on the left side of the main frame assembly 20.

Referring to FIG. 7, the gusset 126 can include a central body 128 and a pair of flanges 130, 132. The central body 128 can extend along the longitudinal direction L and the transverse direction T of the vehicle 10. Each of the flanges 130, 132 can extend along the vertical direction V and the transverse direction T of the vehicle 10. The rearward flange 132 can be a mirror image of the forward flange 130. Each of the central body 128 and the flanges 130, 132 can be a substantially flat plate. The gusset 126 can include rounded corners that form a transition between the central body and each of the flanges 130, 132. The central member 128 can include a central window 134 that can extend through the substantially flat central body 128.

The flanges 130,132 can be spaced apart from each other by the central body 128. For example, the flanges 130,132 can extend from opposite sides of the central body. Each of the flanges 130, 132 can include first projection 136, and a second projection 136 spaced away from the first projection 134. Each of the first and second projections 134, 136 cab terminate at a respective edge 140, 142. Referring to FIGS. 5, 7 and 8, the edge 142 of the second projection 136 can extend at an angle with respect to the edge 140 of the first projection 134.

Referring to FIGS. 5 and 7-9, one end of the central body 128 can be connected to the third lower cross member 44 at a location that includes the respective one of the bends 100L, 100R. Alternatively, the one end of the central body 128 can be connected to the third lower cross member 44 at a location that is spaced away from the one of the bends 100L, 100R. For example, the other end of the central body 128 can be connected to the respective one of the second portions 98L, 98R.

The other end of the central body 128 can be connected to a respective one of the longitudinal members 38L, 38R. For example, the other end of the central body 128 can be connected to the respective one of the longitudinal members 38L, 38R at a location on the respective one of the longitudinal members 38L, 38R that is closer to the top wall 114 than to the cutout 126. The central body 128 can be spaced away from at least a portion of the respective bends 100L, 100R. That is, the central body 128 can be spaced away from a portion of the top wall 106.

Referring to FIG. 9, by spacing the central body 128 away from the top wall 106, the gusset 126 effectively increases the cross-sectional area of the third lower cross member 44 at a location that is adjacent o the outer side wall 120 of the respective one of the longitudinal members 38L, 38R. This can increase the bending modulus of the assembly; thereby further increasing the rigidity of the main frame assembly 30 at the junctions of the cross member 44 with the longitudinal members 38L, 38R. That is, the gusset 126 can enhance the ability of the main frame 30 to absorb and distribute a load or kinetic energy input to either of the fifth cage side members 70L, 70R so that any deformation in the main frame assembly 30 can be held to a relatively small amount or avoided entirely. Thus, in addition to improving the protection level for the adjacent structure 94, the gusset 126 can enhance the safety of the passengers when a load or kinetic energy is input to either of the fifth cage side members 70L, 70R.

3. Welded Connection

The gusset 126 can be welded to each of the third lower cross member 44 and the respective one of the longitudinal members 38L, 38R. For example, one or more seam welds can connect the gusset 126 to each of the third lower cross member 44 and the respective one of the longitudinal members 38L, 38R.

Referring to FIGS. 5 and 7-9, a first seam weld segment 144 can extend along the first projection 136 of the forward flange 130 and the forward side wall 110. A second seam weld segment 146 can extend along each of the second projections 138, the central body 128, the side walls 110, the top wall 106. A third seam weld segment 148 can extend along the first projection 136 (see FIG. 9) of the rearward flange 132 and the rearward side wall 112. Although FIG. 9 illustrates a boundary between the first seam weld segment 144 and the third seam weld segment 146, this depiction is merely schematic and not indicative of the actual welded cross-section. Thus the seam weld segments 144, 146, 148 can connect the gusset 126 to the third lower cross member 44.

A fourth seam weld segment 150 can extend along the side wall 120 of the longitudinal members 38L, 38R and the forward side wall 110 of the third lower cross member 44. Although obscured from view in FIGS. 5 and 7-9, a fifth seam weld segment can extend along the side wall 120 of the longitudinal members 38L, 38R and the rearward side wall 112 of the third lower cross member 44.

Although a plurality of seam weld segments are disclosed, the disclosed subject matter includes any variation of the seam weld segments such that total number of segments increases or decreases as compared to the exemplary embodiment of FIGS. 5 and 7-9. Further, instead of a plurality of seam weld segments, a continuous, seam weld can connect the gusset 126 to each of the third lower cross member 44 and the respective one of the longitudinal members 38L, 38R.

4. Additional Welded Connection

Referring to FIG. 9 a seam weld 152 can extend along the bottom wall 116 of the respective one of the longitudinal members 38L, 38R and the corners of the third lower cross member 44 where the side walls 110, 112 join the bottom wall 108. Referring to FIG. 4, the seam weld 152 (not shown) can extend along the inner side wall 118 and along each the forward side wall 110, the top wall 106 and the rearward side wall 112 of the third lower cross member 44. The seam weld 152 can be segmented or continuous.

III. Alternative Embodiments

While certain embodiments of the invention are described above, and FIGS. 1-9 disclose a best mode for practicing the various inventive aspects, it should be understood that the invention can be embodied and configured in many different ways without departing from the spirit and scope of the invention.

For example, embodiments are disclosed above in the context of a vehicle 10 shown in FIG. 1. However, embodiments are intended to include or otherwise cover any type of vehicle disclosed above. For example, exemplary embodiments are intended to include or otherwise cover any type of vehicle that can travel on an improved surface such as but not limited to a paved road.

Exemplary embodiments are intended to include or otherwise cover any type of rear frame assembly 36. In other words, exemplary embodiments are intended to cover any application of rear frame assembly that can sustain load or kinetic energy inputs from a suspension and wheel assembly at each end of the vehicle. For example, the each of frame members can be made from a plurality of parts or made as a unitary homogenous component. Further, instead of using tubes, the one or more of the frame members can be formed into beam structures that have open cross-sections.

Embodiments are disclosed above in the context of vehicle 10 shown in FIG. 1 having a front frame assembly that includes a front bumper assembly. However, embodiments are intended to include or otherwise cover vehicles that include a rear bumper assembly connected to the rear end of the rear frame assembly.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A frame assembly for a vehicle comprising:
    a cross member extending along a transverse direction of the vehicle and including a bend;
    a longitudinal member extending along a longitudinal direction of the vehicle; and
    a gusset connected to the longitudinal member and the cross member at the bend;
    wherein the longitudinal member includes a cutout portion, and the cross member extends into the cutout portion.

2. The frame assembly according to claim 1, wherein the cross member is a hollow tube having a rectangular cross-section.

3. The frame assembly according to claim 1, wherein
    the gusset is welded to each of the longitudinal member and the cross member, and
    the cross member is welded to the longitudinal member.

4. The frame assembly according to claim 1, wherein the cross member includes a first portion and a second portion, and the bend extends from each of the first portion and the second portion.

5. The frame assembly according to claim 1, wherein the cross member includes a first portion and a second portion, the bend extends from each of the first portion and the second portion, the first portion is on one side of the longitudinal member, and the second portion is on another side of the longitudinal member that is spaced apart from the one side along the transverse direction of the vehicle.

6. The frame assembly according to claim 1, wherein the gusset has a substantially C-shaped cross-section.

7. The frame assembly according to claim 1, wherein the gusset includes a central body and a pair of flanges spaced apart from each other by the central body.

8. The frame assembly according to claim 7, where the central body is spaced away from at least a portion of the bend.

9. The frame assembly according to claim 1, wherein the gusset includes a central body and a pair of flanges extending from opposite sides of the central body, and each of the flanges includes a first projection and a second projection spaced away from the first projection.

10. The frame assembly accordingly to claim 9, wherein each of the first and second projections terminates at a respective edge, and the edge of the second projection extends at an angle with respect to the edge of the first projection.

11. A frame assembly for a vehicle comprising:
    a cross member extending along a transverse direction of the vehicle and including a pair of bends that are spaced apart in the transverse direction of the vehicle;
    a pair of longitudinal members extending along a longitudinal direction of the vehicle, and spaced away from each other in the transverse direction; and
    a pair of gussets, each of the gussets is connected to a respective one of the longitudinal members and a respective one of the bends of the cross member, wherein each of the gussets comprises a central body that overlies a top wall of the cross member, and a pair or flanges extending from opposite sides of the central body and connected to opposite sides of the cross member.

12. The frame assembly according to claim 11, wherein the cross member includes a pair of deformed portions, each of the deformed portions creates a gap between the cross member and a respective one of the longitudinal members.

13. The frame assembly according to claim 11, wherein the cross member includes a pair of deformed portions, each of the deformed portions extends along the bend, and each of the deformed portions is adjacent to a respective one of the longitudinal members.

14. The frame assembly according to claim 12, wherein each of the gussets extends away from the cross member and spans the gap with the respective one of the longitudinal members.

15. The frame assembly according to claim 11, wherein
    each of the longitudinal members includes an inner side and an outer side, the inner sides face each other in the transverse direction of the vehicle and the outer sides face away from each other in the transverse direction of the vehicle,
    the cross frame member further includes,
        a first straight portion that extends between the inner sides, and
        a pair of second portions, each of the second portions extends away from each of the first portion and a respective one of the outer sides.

16. The frame assembly according to claim 11, further comprising a pair of second longitudinal members, each of the second longitudinal members extends along the longitudinal direction of the vehicle, each of the second longitudinal members is spaced away from a respective one of the longitudinal members along each of the transverse direction of the vehicle and a vertical direction of the vehicle, and each of the second longitudinal members is connected to the cross member.

17. An all-terrain vehicle comprising:
a frame assembly including,
a main frame assembly defining a passenger compartment and including,
a cross member extending along a transverse direction of the vehicle and including a pair of bends that are spaced apart in the transverse direction of the vehicle;
a pair of longitudinal members extending along a longitudinal direction of the vehicle, and spaced away from each other in the transverse direction; and
a pair of gussets, each of the gussets is connected to respective one of the longitudinal members and a respective one of the bends of the cross member,
a front frame assembly connected to a front end of the main frame assembly and configured to support a front suspension and wheel assembly, and
a rear frame assembly connected to a rear end of the main frame assembly such that the main frame assembly is located between the front frame assembly and the rear frame assembly, and the rear frame assembly is configured to support a rear suspension and wheel assembly; and
a fluid container connected to the cross member adjacent to the one of the gussets,
wherein the main frame assembly further includes a pair of second longitudinal members, each of the second longitudinal members extends along the longitudinal direction of the vehicle, each of the second longitudinal members is connected to the cross member, and
at least a portion of each of the bends extends upwardly from a respective one of the longitudinal members and terminates at a respective one of the second longitudinal members.

18. The frame assembly according to claim 11, wherein each of the pair of flanges includes a first projection and a second projection spaced away from the first projection such that the first projection and the second projection of each of the flanges are both attached to one of the opposite sides of the cross member.

19. The frame assembly according to claim 18, wherein the central body is substantially flat and comprises a central window extending therethrough.

20. The frame assembly according to claim 11, wherein the central body is a substantially flat member that extends along a length of the cross member.

* * * * *